(12) United States Patent
Torisaka

(10) Patent No.: US 8,006,486 B2
(45) Date of Patent: Aug. 30, 2011

(54) METHOD FOR REGENERATING PARTICULATE FILTER

(75) Inventor: Hisaki Torisaka, Hino (JP)

(73) Assignees: Hino Motors, Ltd., Hino-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 688 days.

(21) Appl. No.: 12/065,170

(22) PCT Filed: Aug. 31, 2006

(86) PCT No.: PCT/JP2006/317193
§ 371 (c)(1), (2), (4) Date: May 6, 2008

(87) PCT Pub. No.: WO2007/026809
PCT Pub. Date: Mar. 8, 2007

(65) Prior Publication Data
US 2009/0145115 A1    Jun. 11, 2009

(30) Foreign Application Priority Data
Sep. 1, 2005   (JP) .................... 2005-253606

(51) Int. Cl.
*F01N 3/00* (2006.01)

(52) U.S. Cl. ............... 60/295; 60/274; 60/286; 60/303

(58) Field of Classification Search ............... 60/274, 60/280, 286, 295, 300, 303, 297, 311
See application file for complete search history.

(56) References Cited

U.S. PATENT DOCUMENTS

| | | | |
|---|---|---|---|
| 7,013,638 B2* | 3/2006 | Hiranuma et al. | 60/286 |
| 7,251,931 B2* | 8/2007 | Nonoyama et al. | 60/297 |
| 7,340,884 B2* | 3/2008 | Matsuno et al. | 60/295 |
| 7,347,043 B2* | 3/2008 | Tahara et al. | 60/297 |
| 7,703,278 B2* | 4/2010 | Kobayashi et al. | 60/297 |
| 2004/0204818 A1 | 10/2004 | Trudell et al. | |
| 2005/0060992 A1* | 3/2005 | Kogo et al. | 60/311 |

FOREIGN PATENT DOCUMENTS

| | | |
|---|---|---|
| DE | 102 51 686 A1 | 10/2003 |
| JP | 2003 83139 | 3/2003 |
| JP | 2003 106136 | 4/2003 |
| JP | 2003 155913 | 5/2003 |
| JP | 2005 098184 | 4/2005 |
| JP | 2005 163652 | 6/2005 |
| JP | 2005 201261 | 7/2005 |

* cited by examiner

*Primary Examiner* — Binh Q Tran
(74) *Attorney, Agent, or Firm* — Oblon, Spivak, McClelland, Maier & Neustadt, L.L.P.

(57) ABSTRACT

A method for forced regeneration of a catalytic regenerative particulate filter is disclosed. An oxidation catalyst is arranged in front of the particulate filter incorporated in the exhaust pipe. When the exhaust temperature measured between the oxidation catalyst and the filter is lower than a first preset temperature and is equal or more than a second preset temperature lower than the first preset temperature, post injection is added at non-ignition timing following the main injection of the fuel near the compression upper dead center to conduct fuel addition. When the exhaust temperature exceeds the first preset temperature, the post injection is stopped and fuel is directly injected into the exhaust pipe upstream of the oxidation catalyst to conduct the fuel addition. Thus, the particulate filter can be regenerated more efficiently and in shorter time.

5 Claims, 3 Drawing Sheets

METHOD FOR REGENERATING PARTICULATE FILTER

TECHNICAL FIELD

The present invention relates to a method for regenerating a particulate filter.

BACKGROUND ART

Particulates or particulate matter entrained in exhaust gas from a diesel engine is mainly constituted by carbonic soot and a soluble organic fraction (SOF) of high-boiling hydrocarbons and contains a trace of sulfate or misty sulfuric acid fraction. In order to reduce a discharged amount of particulates from the engine, a particulate filter is conventionally employed and incorporated in an exhaust pipe through which the exhaust gas flows.

The particulate filter of this kind is a porous honeycomb structure made of ceramics such as cordierite and having lattice-like compartmentalized passages; alternate ones of the passages have plugged inlets and the remaining passages with unplugged open inlets are plugged at their outlets. Thus, only the exhaust gas passing through the thin porous compartment walls is discharged downstream.

The particulates entrained in the exhaust gas, which are captured and accumulated on the inner thin porous compartment walls of the particulate filter, require to be burned off so as to regenerate the particulate filter before exhaust resistance considerably increases due to clogging. However, the exhaust gas from the engine in a normal operation status rarely has a chance to reach a temperature level at which the particulates ignite by themselves. Thus, a catalytic regenerative particulate filter has been developed into practical use which integrally carries an oxidation catalyst made from alumina carrying platinum and added with a required amount of rare-earth element such as cerium.

Use of such catalytic regenerative particulate filter facilitates oxidation of the captured and accumulated particulates and lowers their ignition temperature so that the particulates can be burned off even at an exhaust gas temperature lower than before.

However, even in use of such catalytic regenerative particulate filter, a captured amount of particulates may exceed a burned-off amount of particulates in engine operation areas with low exhaust temperature level; and continued engine operation with such low exhaust temperature level may hinder satisfactory proceeding of regeneration of the particulate filter, resulting in excessive accumulation of the captured particulates in the particulate filter. So, it has been envisaged that fuel is added into the exhaust gas upstream of the particulate filter to forcibly regenerate the particulate filter before the particulates are substantially accumulated.

Specifically, the fuel added to the exhaust gas upstream of the particulate filter is oxidized on the oxidation catalyst carried by the filter to produce reaction heat and raise the temperature of the catalytic floor to burn off the particulates, thus regenerating the particulate filter.

This kind of forcible regeneration of a particulate filter is disclosed, for example, in the undermentioned References 1 and 2 with the applicant same as that of the present invention.
[Reference 1] JP 2003-83139A
[Reference 2] JP 2003-155913A Particularly in an exhaust gas emission control device with a flow-through type oxidation catalyst in front of a particulate filter to assist oxidation of captured particulates in the filter, added fuel is oxidized on the oxidation catalyst in front of the particulate filter to produce reaction heat and raise temperature of exhaust gas which is then introduced into the particulate filter; as a result, the particulate filter can be forcibly regenerated at a further low exhaust temperature level.

SUMMARY OF THE INVENTION

Problems to be Solved by the Invention

Generally conducted in the conventional forced regeneration of a particulate filter is, as disclosed in the above References 1 and 2, fuel addition by post injection at non-ignition timing following the main injection of fuel conducted near compression upper dead center. However, quantitative limitation has been applied to such post injection, otherwise fuel injected at non-ignition timing without vaporization might directly attack cylinder liners to wash away oil film formed on the liners, leading to failures spoiling engine reliability. Moreover, if regeneration of the particulate filter is not complete even after finish of a predetermined amount of fuel addition through a number of times of post injection, the post injection is once suspended and is restarted after lapse of a predetermined time so as to prevent excessive amount of fuel addition to the cylinders beyond allowable limit. Such intermittent repetition of the post injection may cause substantial deterioration of mileage.

Fuel addition has been also proposed in the form of an injector as fuel addition means extending through an exhaust pipe upstream of an oxidation catalyst to directly inject fuel into the exhaust pipe. However, this is disadvantageous in that fuel addition must be started with operation status of higher exhaust temperature at an engine outlet side than that in fuel addition through the post injection since the exhaust gas becomes lowered in temperature during flowing from the engine to the injector incorporated in the exhaust pipe.

Specifically, when no sufficiently high exhaust temperature is maintained at a point of adding the fuel through the injector, the added fuel is not turned into highly concentrated HC gas but is entrained in the exhaust gas as it remains misty. As a result, untreated misty components of the added fuel are accumulated as SOF on a front end of the oxidation catalyst which has not yet sufficiently enhanced catalytic activity. This makes the front end of the oxidation catalyst into sticky wet state to which soot of the particulates tends to attach.

If a mixture of the soot accumulated on the catalyst with the above-mentioned SOF undergoes incomplete combustion into agglomerates which may form bridges on openings of the respective cells; then the agglomeration may further proceed with such bridges as cores, resulting in clogging on the front end of the oxidation catalyst.

The invention was made in view of the above and has its object to attain regeneration of a particulate filter more efficiently and in shorter time than before.

Means or Measures for Solving the Problems

The invention is directed to a method for regenerating a particulate filter wherein an oxidation catalyst is provided in front of a catalytic regenerative particulate filter incorporated in an exhaust pipe, fuel being added into exhaust gas upstream of the particulate filter, reaction heat due to oxidation reaction of the added fuel on the front-end oxidation catalyst causing captured particulate in the back-end particulate filter to burn so as to conduct forced regeneration of the particulate filter, characterized in that, when exhaust temperature measured between the oxidation catalyst and the particulate filter is lower than a first preset temperature and is equal to or is more than a second preset temperature lower than the first preset temperature, post injection is added at non-ignition timing following main injection of fuel near a compression upper dead center so as to conduct fuel addition and that, when said exhaust temperature exceeds the first preset temperature, the post injection is stopped and fuel is directly injected into the exhaust pipe upstream of said oxidation catalyst so as to conduct fuel addition.

Thus, the post injection is started even at a level of the second preset temperature lower than the first preset temperature where direct injection of the fuel into the exhaust pipe is started, and the added fuel satisfactorily turns out into the highly concentrated HC gas in the cylinders having temperature relatively higher than that of the exhaust pipe, the highly concentrated HC gas being caused to flow to the front-end oxidation catalyst where it undergoes oxidation reaction. The exhaust gas raised in temperature due to such reaction heat is caused to flow into the back-end particulate filter to raise the catalytic floor temperature in the particulate filter.

Substantially when the catalytic floor temperature in the front-end oxidation catalyst is raised by the reaction heat to enhance the catalytic activity to a predetermined level, the exhaust temperature measured between the oxidation catalyst and the particulate filter reaches a first preset temperature. Then, the post injection is stopped and direct injection of the fuel into the exhaust pipe is started, so that fuel addition can be conducted by an injected amount more than allowable limit in post injection.

Since the catalytic activity has been enhanced to the predetermined level in the front-end oxidation catalyst due to the fuel addition though the post injection, there is no fear of the added fuel remaining untreated upon direct injection of the fuel into the exhaust pipe by the amount more that that in the initial post injection. Since the fuel addition is directed inside of the exhaust pipe, there is no fear of the engine reliability being adversely affected even if direct injection of fuel into the exhaust pipe is continued until regeneration of the particulate filter is ascertained.

Thus, after the exhaust temperature measured between the oxidation catalyst and the particulate filter reaches the first preset temperature, the fuel is directly injected into the exhaust pipe without interruption by the amount more than that in the initial post injection, which can make the catalytic floor temperature in the back-end particulate filter raised rapidly to finish regeneration of the particulate filter effectively and in shorter time.

EFFECTS OF THE INVENTION

According to a method for regenerating a particulate filter of the invention as mentioned above, the forced regeneration of the particulate filter can be started even in an operation status with relatively low exhaust temperature competitive to that in the conventional forced regeneration of the particulate filter conducted only by post injection; moreover, after the exhaust temperature measured between the oxidation catalyst and the particulate filter reaches the first preset temperature, the post injection is stopped and direct injection of the fuel into the exhaust pipe is continued without interruption by an amount more than that in the initial post injection, which can make the catalytic floor temperature in the back-end particulate filter raised rapidly, advantageously resulting in excellent effects that the particulate filter can be regenerated more effectively and in shorter time than before and substantial deterioration of mileage can be suppressed.

Figure 1:
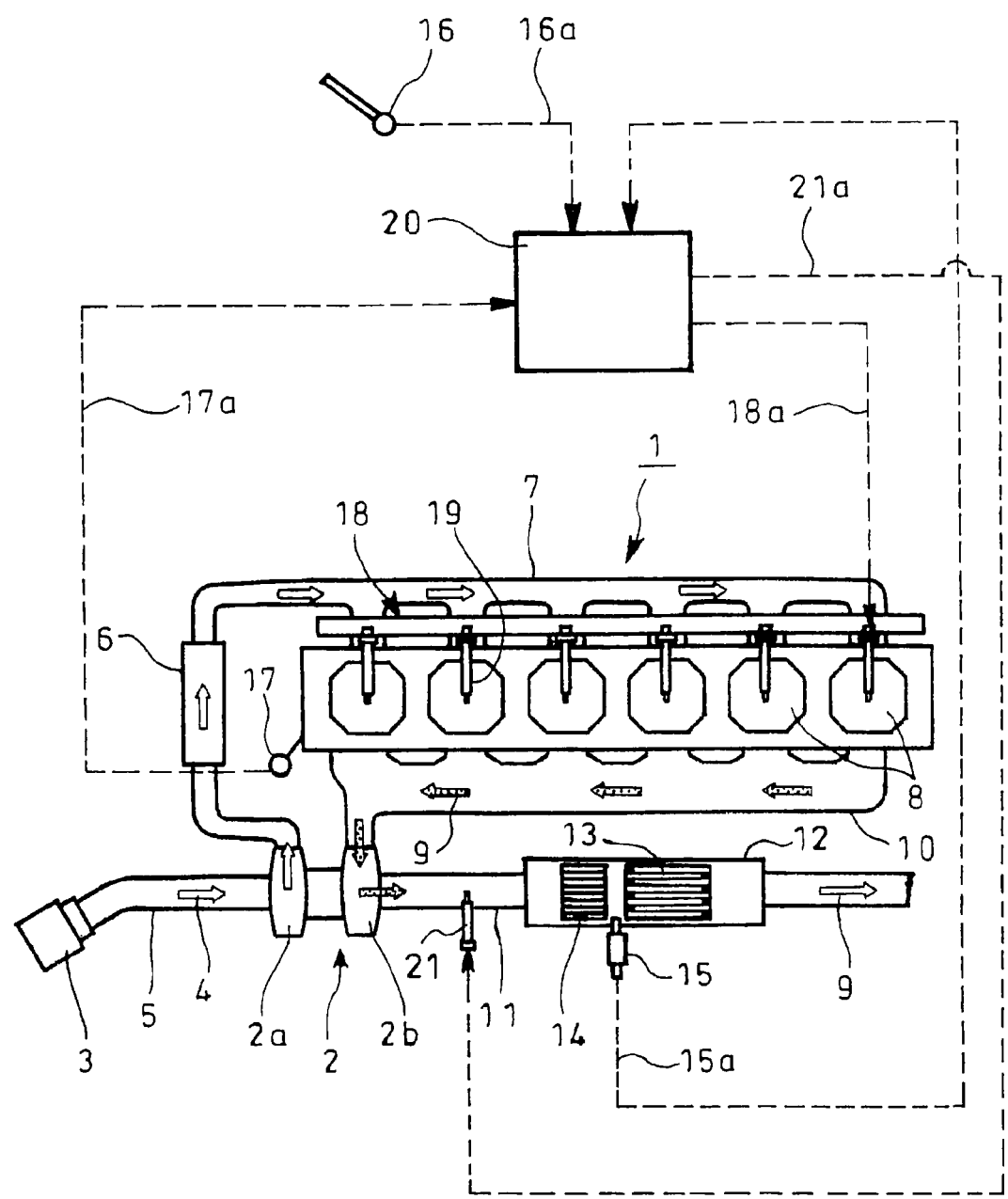
FIG. 1 is a schematic view showing an embodiment of the invention.

EXPLANATION OF THE REFERENCE NUMERALS 9 exhaust gas
11 exhaust pipe
13 particulate filter
14 oxidation catalyst
15 temperature sensor
18 fuel injection device
20 controller
21 injector

BEST MODE FOR CARRYING OUT THE INVENTION

An embodiment of the invention will be described in conjunction with the drawings.

FIGS. 1-4 show an embodiment of the invention. In FIG. 1, reference numeral 1 denotes a diesel engine with a turbocharger 2 comprising a compressor 2a and a turbine 2b. Intake air 4 from an air cleaner 3 flows through an intake pipe 5 to the compressor 2a of the turbocharger 2 where it is pressurized. The air 4 thus pressurized is fed to and cooled by an intercooler 6 and further fed to an intake manifold 7 where it is distributed to respective cylinders 8 of the diesel engine 1 (FIG. 1 exemplifies the engine having in-line six cylinders).

Exhaust gas 9 from the respective cylinders 8 of the diesel engine 1 is fed via an exhaust manifold 10 to the turbine 2b of the turbocharger 2. After driving the turbine 2b, the exhaust gas 9 is discharged outside via an exhaust pipe 11.

Figure 2:
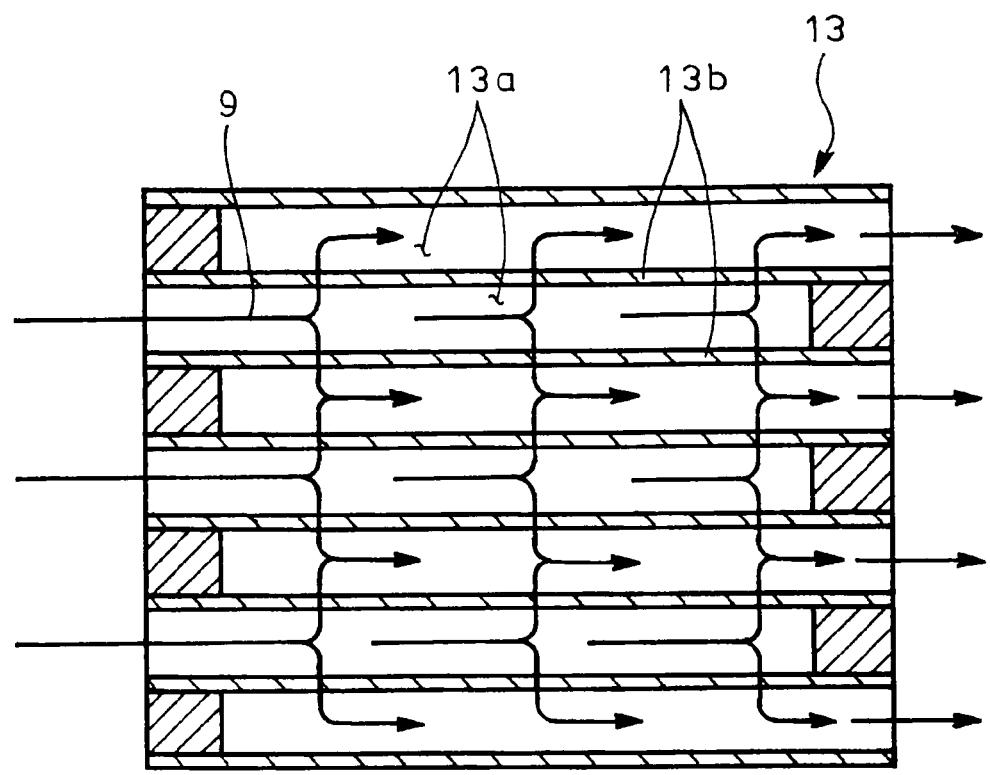
FIG. 2 is a sectional view showing particulars of a particulate filter shown in FIG. 1.

Incorporated in the exhaust pipe 11 is a filter casing 12 which accommodates on its back-end a catalytic regenerative particulate filter 13 integrally carrying an oxidation catalyst. As shown in FIG. 2 in an enlarged scale, the particulate filter 13 is a porous honeycomb structure made of ceramics and having lattice-like compartmentalized passages 13a. Alternate ones of the passages 13a have plugged inlets and the remaining passages 13a with unplugged open inlets are plugged at their outlets. Thus, only the exhaust gas 9 passing through thin porous compartment walls 13b which define the passages 13a is discharged downstream.

Figure 3:
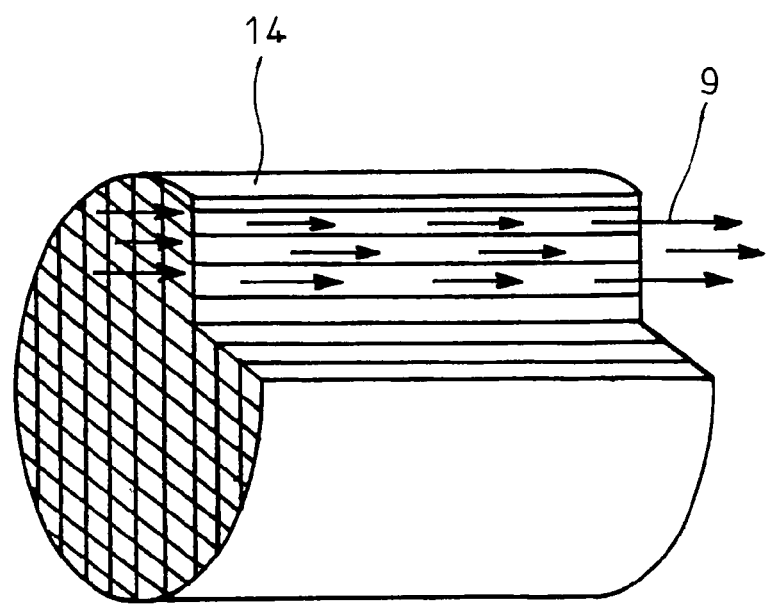
FIG. 3 is a partly cut-out perspective view showing particulars of an oxidation catalyst shown in FIG. 1.

The filter casing 12 further accommodates just before the particulate filter 13 a flow-through type oxidation catalyst 14 having a honeycomb structure as shown in FIG. 3 in an enlarged scale.

Arranged in the filter casing 12 between the oxidation catalyst 14 and the particulate filter 13 is a temperature sensor 15 which measures temperature of the exhaust gas 9 as substitutive for a catalytic floor temperature of the particulate filter 13, a temperature signal 15a from the temperature sensor 15 being inputted to a controller 20 which constitutes an engine control computer or electronic control unit (ECU).

The controller 20, which serves also as an engine control computer, is responsible also for fuel injection control. More specifically, it outputs a fuel injection signal 18a to a fuel injection device 18 which injects fuel to the respective cylinders 8 of the diesel engine 1 on the basis of an accelerator step-in degree signal 16a from an accelerator sensor 16 (load sensor) which detects an accelerator step-in degree as load for the engine 1 and a rotational frequency signal 17a from a rotational frequency sensor 17 which detects rotational frequency of the engine 1.

The fuel injection device 18 comprises a plurality of injectors 19 each for each cylinder 8, an electromagnetic valve of each of the injectors 19 being properly controlled on the basis of the fuel injection signal 18a to open to properly control an injection timing (valve-opening timing) and an injected amount (valve-opening time) of the fuel.

In the embodiment, at an entry side of the filter casing 12 and as separate fuel addition means independently of the fuel injection device 18, an injector 21 extends through the exhaust pipe so as to directly inject fuel for addition into the exhaust gas 9 in the exhaust pipe 11 on the basis of a command signal 21a from the controller 20.

In the controller 20, the fuel injection signal 18a in normal mode is determined on the basis of the accelerator step-in degree signal 16a and the rotational frequency signal 17a; when regeneration control becomes necessary for the particulate filter 13, the normal mode is changed over into the regeneration mode, the fuel injection signal 18a being determined to conduct post injection following the main injection of fuel near compression upper dead center (crank angle 0°) and at non-ignition timing (starting being in a range of crank angle of 90°-120°) after the compression upper dead center.

Specifically, when such post injection following the main injection is conducted at non-ignition timing after the compression upper dead center, the post injection causes unburned fuel (mainly hydrocarbons: HC) to be added into the exhaust gas in the cylinders 8, so that the unburned fuel turns out into the highly concentrated HC gas which flows to the front-end oxidation catalyst 14 to bring about the oxidation reaction. Resultant reaction heat raises in temperature the exhaust gas 9 which flows into the back-end particulate filter 13, so that the catalytic floor temperature in the particulate filter 13 is raised to burn off the inner captured particulates.

In the controller 20, the rotational frequency of the diesel engine 1 is extracted from a rotational frequency signal 17a from the rotational frequency sensor 17, and an injected amount of the fuel is extracted which has been revealed upon determination of the fuel injection signal 18a based on the accelerator step-in degree signal 16a from the accelerator sensor 16. From a generated amount map based on the rotational frequency and the injected amount, a fundamental generated amount of the particles is estimated based on the current operation conditions of the diesel engine 1. The estimated fundamental generated amount is multiplied by modification coefficient determined in consideration of various conditions relating to generation of particulates, and a treated amount of the particulates in the current operation conditions is subtracted from this to obtain a final generated amount, such final generated amounts being momentarily cumulated to estimate an accumulated amount of the particulates.

There may be various ways to estimate the accumulated amount of such particulates. Of course, any technique other than the estimation method exemplified herein may be used to estimate the accumulated amount of the particulates.

Figure 4:
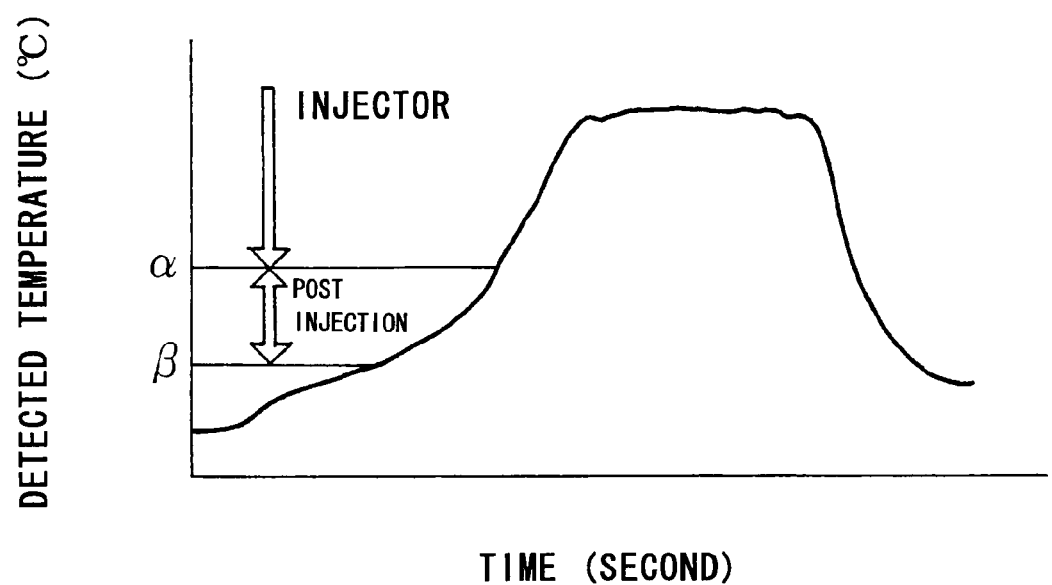
FIG. 4 is a graph showing transition over time of temperature detected by a temperature sensor shown in FIG. 1.

After the accumulated amount of the particles in the controller 20 is estimated to reach a predetermined target value, the fuel injection control is changed over from the normal mode to the regenerative mode under the conditions determined by the temperature signal 15a from the temperature sensor 15 that the exhaust temperature at the entry side of the particulate filter 13 is lower than the first preset temperature $\alpha$ and is equal to or more than the second preset temperature $\beta$ lower than the first preset temperature $\alpha$; when the exhaust temperature at the entry side of the particulate filter 13 exceeds the first preset temperature $\alpha$, the post injection is stopped and is followed by the fuel addition in the form of direct injection of the fuel into the exhaust pipe 11 through the injector 21 (see FIG. 4).

Thus, when judgement is made in the controller 20 such that the accumulated amount of the particulates is increased into the condition of requiring forced regeneration of the particulate filter 13, then the regeneration mode is selected under the condition that the temperature detected by the temperature sensor 15 is lower than the first preset temperature $\alpha$ and is equal to or more than the second preset temperature $\beta$, the fuel injection pattern being changed over by the controller 20 from the normal mode to the regeneration mode where applied is an injection pattern of conducting the post injection following the main injection and at non-ignition timing after the compression upper dead center, so that the fuel added as unburned one into the exhaust gas 9 by the post injection turns out into highly concentrated HC gas which flows to the oxidation catalyst 14 and to conduct the oxidation reaction, the exhaust gas 9 raised in temperature by the resultant reaction heat flowing into the back-end particulate filter 13 to raise the catalytic floor temperature of the particulate filter 13.

Substantially when the catalytic floor temperature in the upstream oxidation catalyst 14 is raised by the reaction heat to enhance the catalytic activity to the predetermined level, the exhaust temperature measured by the temperature sensor 15 reaches the first preset temperature $\alpha$, so that the post injection is stopped by the controller 20 and the command signal 21a is outputted from the controller 20 to start direct fuel injection by the injector 21 into the exhaust pipe 11, whereby fuel addition is conducted by an injected amount more than the allowable limit in the post injection.

In this case, in the front-end oxidation catalyst 14, the catalytic activity has already been enhanced to the predetermined level by the fuel addition through the post injection, so that there is no fear of the added fuel remaining without treated even if the fuel is directly injected by the amount more than that of the initial post injection; moreover, since the fuel addition is directed to inside of the exhaust pipe 11, there is no fear of the engine reliability being adversely affected even if the direct injection of the fuel into the exhaust pipe 11 is continued until the regeneration of the particulate filter 13 is ascertained.

Therefore, when the fuel is continued to be directly injected without interruption into the exhaust pipe 11 by an amount more than that of the initial post injection after the exhaust temperature measured by the temperature sensor 15 reaches the first preset temperature $\alpha$, the catalytic floor temperature of the back-end particulate filter 13 can be rapidly raised to finish the regeneration of the particulate filter 13 effectively and in shorter time.

In the embodiment, the temperature of the exhaust gas 9 passing through the front-end oxidation catalyst 14 and elevated in temperature by the reaction heat is detected at the entry side of the particulate filter 13 by the temperature sensor 15. Such temperature detected by the temperature sensor 15 is the temperature of the exhaust after its temperature conversion through the front-end oxidation catalyst 14 and just before its inflow into the particulate filter 13, so that it has high correlation to the temperature of the catalytic floor in the particulate filter 13 and the catalytic floor temperature of the particulate filter 13 can be accurately grasped on the basis of the exhaust temperature.

Thus, according to the above embodiment, the forced regeneration of the particulate filter 13 can be started even at an operation status with a relatively low exhaust temperature competitive to that in the conventional forced regeneration of the particulate filter 13 conducted only by the post injection. After the exhaust temperature between the oxidation catalyst 14 and the particulate filter 13 measured by the temperature sensor 15 reaches the first preset temperature α, the post injection is stopped and the fuel can be continued to be directly injected without interruption into the exhaust pipe by an amount more than that in the initial post injection, so that the catalytic floor temperature in the back-end particulate filter 13 can be rapidly raised, whereby the particulate filter 13 can be regenerated more efficiency and at shorter time than before and substantial deterioration in mileage can be suppressed.

It is to be understood that a method for regenerating particulate filter according to the invention is not limited to the above embodiment and that various changes and modifications may be made without leaving the spirit of the invention.

The invention claimed is:

1. A method for regenerating a catalytic regenerative particulate filter, wherein an oxidation catalyst is provided in upstream of the catalytic regenerative particulate filter incorporated in an exhaust pipe, the method comprising:

measuring an exhaust temperature between the oxidation catalyst and the particulate filter; and adding fuel into exhaust gas upstream of the particulate filter such that reaction heat due to an oxidation reaction of the added fuel on the oxidation catalyst causes captured particulate in the particulate filter to burn so as to conduct forced regeneration of the particulate filter, wherein, when the measured exhaust temperature between the oxidation catalyst and the particulate filter is lower than a first preset temperature and is equal to or is more than a second preset temperature lower than the first preset temperature, post injection of fuel is added at non-ignition timing following main injection of fuel near compression upper dead center so as to conduct fuel addition, and wherein, when the measured exhaust temperature between the oxidation catalyst and the particulate filter exceeds the first preset temperature, the post injection of fuel is stopped and fuel is directly injected into the exhaust pipe upstream of the oxidation catalyst so as to conduct fuel addition.

2. The method as claimed in claim 1, wherein the post injection of fuel is added to exhaust gas in cylinders of an engine such that unburned fuel is added to the exhaust gas in the cylinders to produce a high concentration hydrocarbon gas.

3. The method as claimed in claim 2, wherein the high concentration hydrocarbon gas flows to the oxidation catalyst to cause the oxidation reaction.

4. The method as claimed in claim 1, wherein the post injection of fuel is also added following the main injection of fuel near compression upper dead center.

5. The method as claimed in claim 4, wherein a crank angle of compression upper dead center is 0° and a crank angle of the non-ignition timing following the main injection of fuel near compression dead center is between 90° and 120°.

* * * * *